United States Patent
Manaois et al.

(10) Patent No.: US 9,313,379 B2
(45) Date of Patent: Apr. 12, 2016

(54) CAMERA WASHING SYSTEM

(71) Applicant: Illinois State Toll Highway Authority, Downers Grove, IL (US)

(72) Inventors: Arthur C. Manaois, Mt. Prospect, IL (US); Michael G. Wayne, Antioch, IL (US); Michael Catolico, Chicago, IL (US)

(73) Assignee: Illinois State Toll Highway Authority, Downers Grove, IL (US)

( * ) Notice: Subject to any disclaimer, the term of this patent is extended or adjusted under 35 U.S.C. 154(b) by 0 days.

(21) Appl. No.: 14/026,732

(22) Filed: Sep. 13, 2013

(65) Prior Publication Data

US 2014/0007909 A1    Jan. 9, 2014

Related U.S. Application Data

(60) Provisional application No. 61/705,017, filed on Sep. 24, 2012.

(51) Int. Cl.
| | |
|---|---|
| *H04N 5/225* | (2006.01) |
| *H04N 5/232* | (2006.01) |
| *G02B 27/00* | (2006.01) |
| *B05B 7/26* | (2006.01) |
| *B05B 12/12* | (2006.01) |

(52) U.S. Cl.
CPC .............. *H04N 5/2251* (2013.01); *B05B 7/267* (2013.01); *B05B 12/12* (2013.01); *G02B 27/0006* (2013.01); *H04N 5/23229* (2013.01)

(58) Field of Classification Search
CPC ....... B05B 7/267; B05B 7/26; G02B 27/0006
See application file for complete search history.

(56) References Cited

U.S. PATENT DOCUMENTS 3,744,873 A    7/1973    Jamison
6,171,559 B1 *    1/2001    Sanders et al. ................ 422/300

(Continued)

FOREIGN PATENT DOCUMENTS

GB    2488420 A  *  8/2012

OTHER PUBLICATIONS

US As International Searching Authority, International Search Report and Written Opinion of the International Searching Authority, issued on Application No. PCT/US13/61419 on Mar. 10, 2014.

*Primary Examiner* — Nicole Blan
(74) *Attorney, Agent, or Firm* — Perkins IP Law Group LLC; Karen Blouin; Jefferson Perkins

(57) ABSTRACT

A roadway monitoring camera cleaning system includes one or more cameras for capturing images through respective viewing surfaces, which are exposed to outdoor environmental conditions. A controller coupled to the cameras receives the images and determines whether a predetermined wash threshold has been met based on any of various indicia of image degradation. Responsive to the wash threshold being met, the controller operates a supply valve to connect a wash fluid source to a conduit, and operates at least one delivery tube valve to connect the supply conduit to at least one delivery tube. Wash fluid is delivered under pressure to the dirty viewing surface as a result. Subsequently, the controller may disconnect the wash fluid source and connect a pressurized source of inert dry gas, in order to dry the viewing surface and to purge the delivery tube of wash fluid.

11 Claims, 4 Drawing Sheets

(56) References Cited

U.S. PATENT DOCUMENTS

| | | | |
|---|---|---|---|
| 6,527,000 B1 * | 3/2003 | Randmae et al. | 134/99.1 |
| 6,554,210 B2 | 4/2003 | Holt et al. | |
| 6,793,416 B2 | 9/2004 | Peterson et al. | |
| 6,944,908 B2 | 9/2005 | Hoetzer et al. | |
| 2002/0139394 A1 * | 10/2002 | Bronson | 134/6 |
| 2003/0155001 A1 * | 8/2003 | Hoetzer et al. | 134/37 |
| 2004/0056779 A1 | 3/2004 | Rast | |
| 2004/0144186 A1 * | 7/2004 | Ketley | 73/865.9 |
| 2005/0109374 A1 * | 5/2005 | Letessier et al. | 134/22.1 |
| 2008/0225669 A1 | 9/2008 | Verschuren | |
| 2009/0011523 A1 * | 1/2009 | Gale | 438/5 |
| 2009/0231161 A1 * | 9/2009 | Malarky | 340/933 |
| 2009/0277473 A1 * | 11/2009 | Boggs | 134/7 |
| 2009/0316002 A1 * | 12/2009 | Ishiga | 348/187 |
| 2010/0321537 A1 * | 12/2010 | Zamfir et al. | 348/241 |
| 2011/0103647 A1 | 5/2011 | Leopold et al. | |
| 2011/0247658 A1 | 10/2011 | Kwak et al. | |
| 2012/0143430 A1 | 6/2012 | Broggi et al. | |
| 2012/0162431 A1 | 6/2012 | Riesebosch | |

* cited by examiner

CAMERA WASHING SYSTEM

BACKGROUND OF THE INVENTION

The lenses of cameras used in intersection and roadway monitoring systems must be cleaned periodically in order to prevent dirt and other debris from settling on the lenses and obscuring or distorting the images. In many instances these cameras are mounted at heights and locations intended to maximize the coverage of the cameras, but are not easily accessible in a safe manner, particularly not in winter conditions. Cameras have, for example, been mounted on gantries over road lanes, poles or posts at the side of the road, and on the rooftops or sides of buildings. Conventionally, cleaning is done manually at considerable expense and, in the instance of over-the-road gantries, often requires one or more lanes of traffic to be shut down. If the cameras in the system cannot be cleaned in a timely fashion, considerable revenue can be lost and the ability to enforce traffic laws may be compromised. Further, where cameras are used to recognize the numbers on the license plates of passing vehicles, the optical character recognition (OCR) software will reject more and more images as unreadable as the camera images degrade, requiring more and more manual review.

SUMMARY OF THE INVENTION

In one aspect, a roadway monitoring camera cleaning system comprises at least one roadway monitoring camera for capturing images through a viewing surface that is exposed to outdoor environmental conditions. A pressurized wash fluid source is connected to a supply end of a conduit by means of a supply valve. A delivery end of the conduit is disposed proximate to the camera viewing surface. A controller is coupled to the camera for receiving camera images and determining whether the images have degraded to such a degree that a predetermined wash threshold has been met. Any of various degradation criteria can be used, such as opacity, refractive index or optical character recognition (OCR) confidence interval. When the controller determines that the wash threshold has been met, it actuates the supply valve to connect the pressurized wash fluid source to the conduit, in turn causing wash fluid to impinge on and wash the camera viewing surface.

In another aspect, a roadway monitoring camera cleaning system comprises a plurality of such roadway monitoring cameras. A conduit connects a pressurized wash fluid source with a delivery tube manifold. A plurality of delivery tube valves are each operable to connect the manifold to respective ones of a plurality of delivery tubes, delivery ends of which are disposed to be proximate to the viewing surfaces of respective cameras. In one embodiment, the delivery tube valves are selectively operated by a controller responsive to image data from one or more of the cameras reaching a predetermined wash threshold.

In another aspect, which can be an additional feature of either of the above two embodiments, the system further includes a source of dry, inert, compressed gas. The valve(s) can be operated by the controller to disconnect the wash fluid source and to connect the gas source, such that the camera viewing surface(s) are dried. The gas can also be used to purge the delivery tube(s) of wash fluid, which can be particularly important in freezing conditions.

In another aspect, a method of cleaning a roadway monitoring camera system comprises the steps of taking an image with at least one camera through a viewing surface exposed to outdoor environmental conditions, and using a controller to automatically determine from the image whether a predetermined wash threshold has been reached. If it has, the controller actuates the system to flow wash fluid from a wash fluid source through a delivery tube, so as to impinge on the camera viewing surface. In one embodiment, the method includes the further step of following the wash fluid with a compressed gas in order to dry the viewing surface. The gas phase can also be used to purge the delivery lines of fluid.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
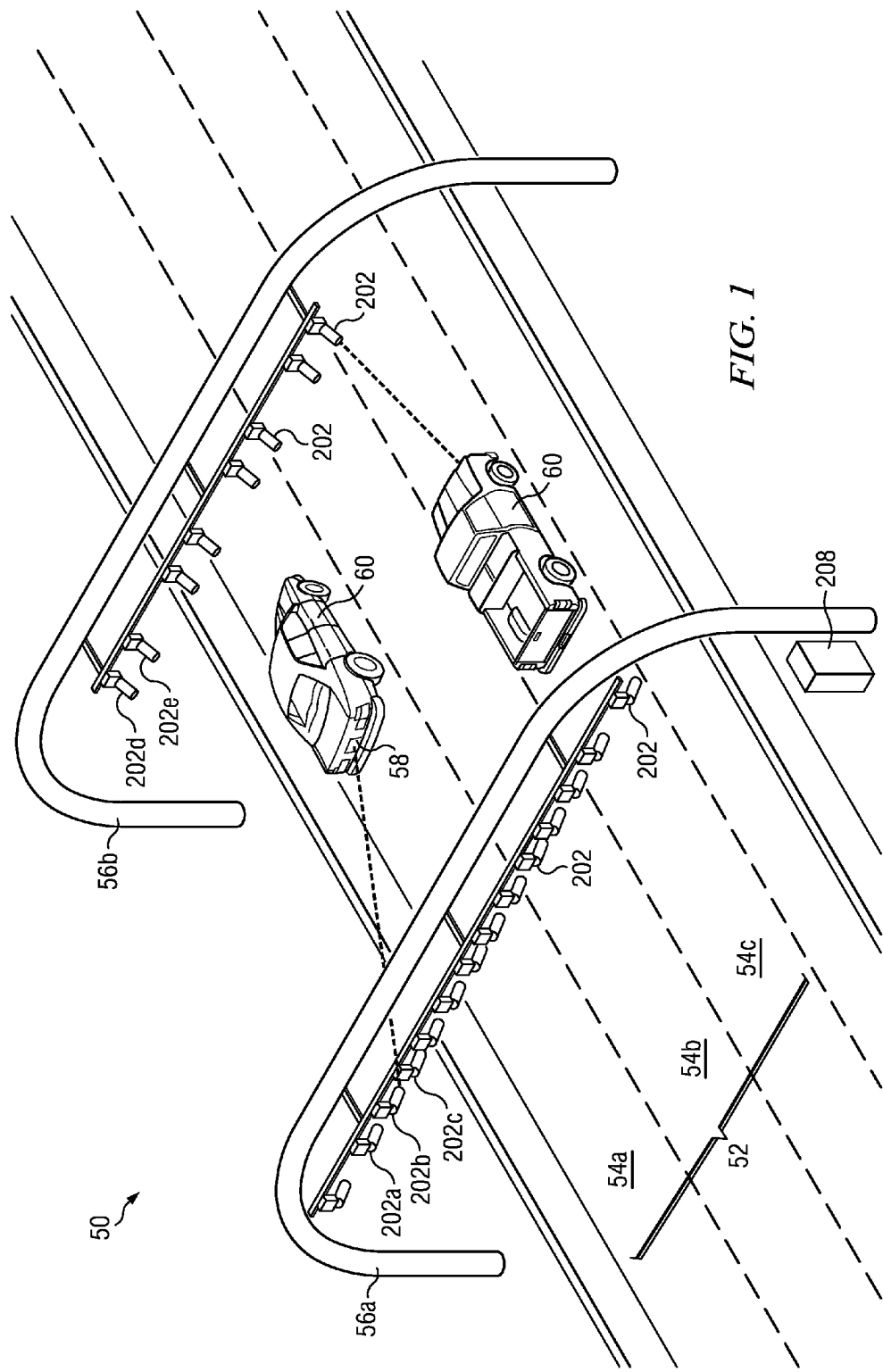
FIG. 1 is an overhead isometric view of a gantry positioned over multiple lanes of vehicular traffic, showing multiple camera positions.

Referring to FIG. 1, the invention may be advantageously employed in an over-the-roadway camera monitoring system indicated generally at 50. A multiple-lane roadway 52 includes, by way of example, three lanes 54a-54c of traffic; this roadway 52 is typically paired with another roadway (not shown) having multiple lanes of traffic in the opposite direction and for which is provided another monitoring system (not shown).

In the illustrated embodiment, the system has multiple imaging cameras 202. Each lane 54 has five cameras devoted to it. By way of example, for left lane 54a, three cameras 202a-c are pointed forward, so as to capture images of the rear license plates 58 of vehicles 60 passing underneath, while two cameras 202d-e are pointed backward, so as to capture images of the front license plates of the vehicles 60. Front-facing cameras 202a-c are mounted on a first gantry 56a, while rear-facing cameras 202d-e are mounted on a second gantry 56b disposed forwardly of and in parallel to gantry 56a. While three lanes 54 are shown by way of example, the invention has application to camera monitoring systems for any number of lanes, from one to four or more. The imaging can, for example, be used to identify vehicle license plates for the assessment of road tolls.

To be useful the images captured by the cameras 202a-e have to have sufficient resolution to read the license plate numbers off of them, as by means of an optical character reading program. The accumulation of debris on the outer lenses, such as snow, ice, sleet, dirt, dust, salt or the like, degrades the captured image until too many of the license plates 58 are not being correctly read. This means that the camera lenses have to be cleaned. Particularly for cameras mounted over lanes of high-speed, high-volume traffic, this can be very hazardous if it is done manually, and the presence of workers on the gantries 56 engaged in manually cleaning the camera lenses poses an additional and undesirable distraction to the vehicle drivers. While the system has been illustrated in conjunction with license plate imaging apparatus for tollways, it has application to any other situation in which one or more imaging cameras are mounted in such a way that their cleaning is difficult. The system has application to red light enforcement, vehicle speed monitoring and general security, for example.

Figure 2:
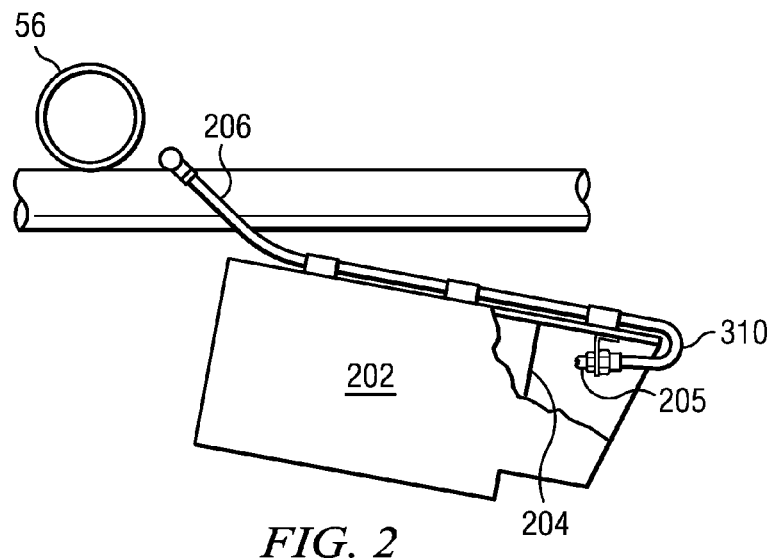
FIG. 2 is a schematic detail, with parts broken away, of one of the cameras shown in FIG. 1, with associated cleaning apparatus.

A schematic detail of one of the cameras 202 is shown in FIG. 2. The camera 202 has an objective lens or other viewing surface 204 through which all photographic images are taken. A nozzle 205 is positioned in front of the viewing surface 204 so as to direct fluid and then gas onto the viewing surface 204. The nozzle 205 is connected by a delivery tube 206 back to suitable valving and a manifold (described below) which in turn will connect to a source of washing fluid and to a source of pressurized dry gas (also described below). In the illustrated embodiment, one delivery tube 206 is provided for each camera 202. In other embodiments delivery tubes 206 can be fewer in number than the number of cameras 202 and can be appropriately branched to service two or more cameras per tube; the designer will wish to consider the fluid pressure needed for washing multiple cameras at once, and the desirability of washing only selected ones of the cameras or only those cameras which have gotten sufficiently dirty.

Returning to FIG. 1, a cabinet 208 may be provided at the side of the roadway 52 for housing the various valves, switches and supplies (described in more detail below) actuated in the course of operating the cleaning system. Other components, such as OCR apparatus, may be housed remotely. The cabinet 208 may be used to shelter as many components of the cleaning system as possible, so that only the delivery tubes 206 and nozzles 205 are exposed to the elements. Respective delivery tubes 206 (FIGS. 2-4) extend from the cabinet 208 to each of the cameras 202, and are affixed to a gantry 56a or 56b in any suitable manner.

Figure 3:
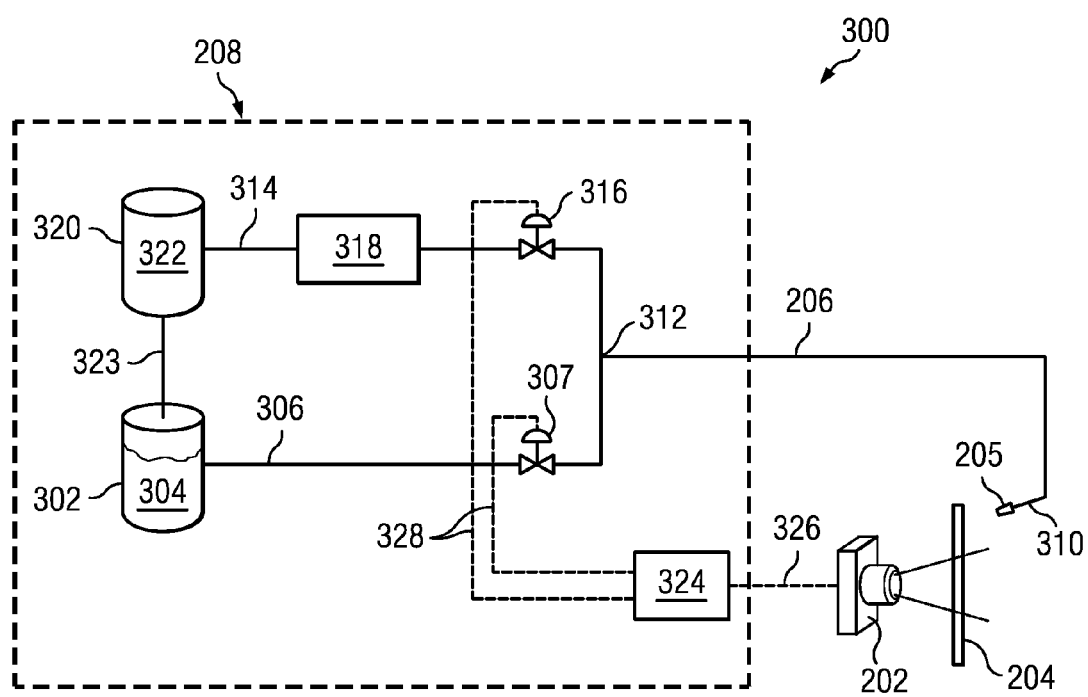
FIG. 3 is a schematic diagram of a roadway monitoring camera cleaning system according to one embodiment of the invention for cleaning a single camera.

Referring to FIG. 3, a representative single-camera cleaning system, indicated generally at 300, includes a roadway monitoring or other camera 202 that captures, for example, images of a roadway (see 52 in FIG. 1) and license plates 58 on vehicles 60 traveling on that roadway. The system 300 can be used anywhere a fixed camera system can be used. Specifically, the inventors contemplate that the system 300 may be used at intersections in conjunction with "red light" traffic cameras, with traffic monitoring cameras on open portions of a highway, or (as illustrated) in conjunction with tollbooths and toll plazas. The camera 202 captures the image or images through the viewing surface 204 that is exposed to outdoor environmental conditions. The viewing surface 204 may be integrated into the camera 202 (for example, it can be the objective lens) or may be separate from the camera.

A wash fluid source 302 provides a wash fluid 304 that is used to clean the viewing surface 204. The wash fluid 304 passes through a supply conduit 306 to a valve 307, which in turn is operable to pass the fluid to a delivery tube 206. A downstream end 310 of the delivery tube 206 is positioned to be proximate to the viewing surface 204, and may terminate in a nozzle 205 as previously described. An upstream end 312 of the tube 206 is also selectively connectable to a gas supply conduit 314 via a valve 316. As present in conduit 314 and at locations downstream from there, the gas should be inert, dry and under pressure; for this purpose, and if compressed air is used, a dryer 318 can be interposed in the gas supply conduit 314 between valve 316 and a pressurized gas supply source 320.

A variety of types of fluids may be used as wash fluid 304. Preferably, the wash fluid 304 should be environmentally safe with effective cleaning properties over a wide range of temperature, such as a typical windshield washer fluid. The viewing surface 204 should be treated with a Glass Treatment, such as Rain-X® or similar product, to reduce wettability of the viewing surface 204, beading of the wash fluid 304 into droplets after it impacts the viewing surface 204. This enhances the removal of the wash fluid and other debris from the viewing surface 204 by the compressed gas 322.

Figure 4:
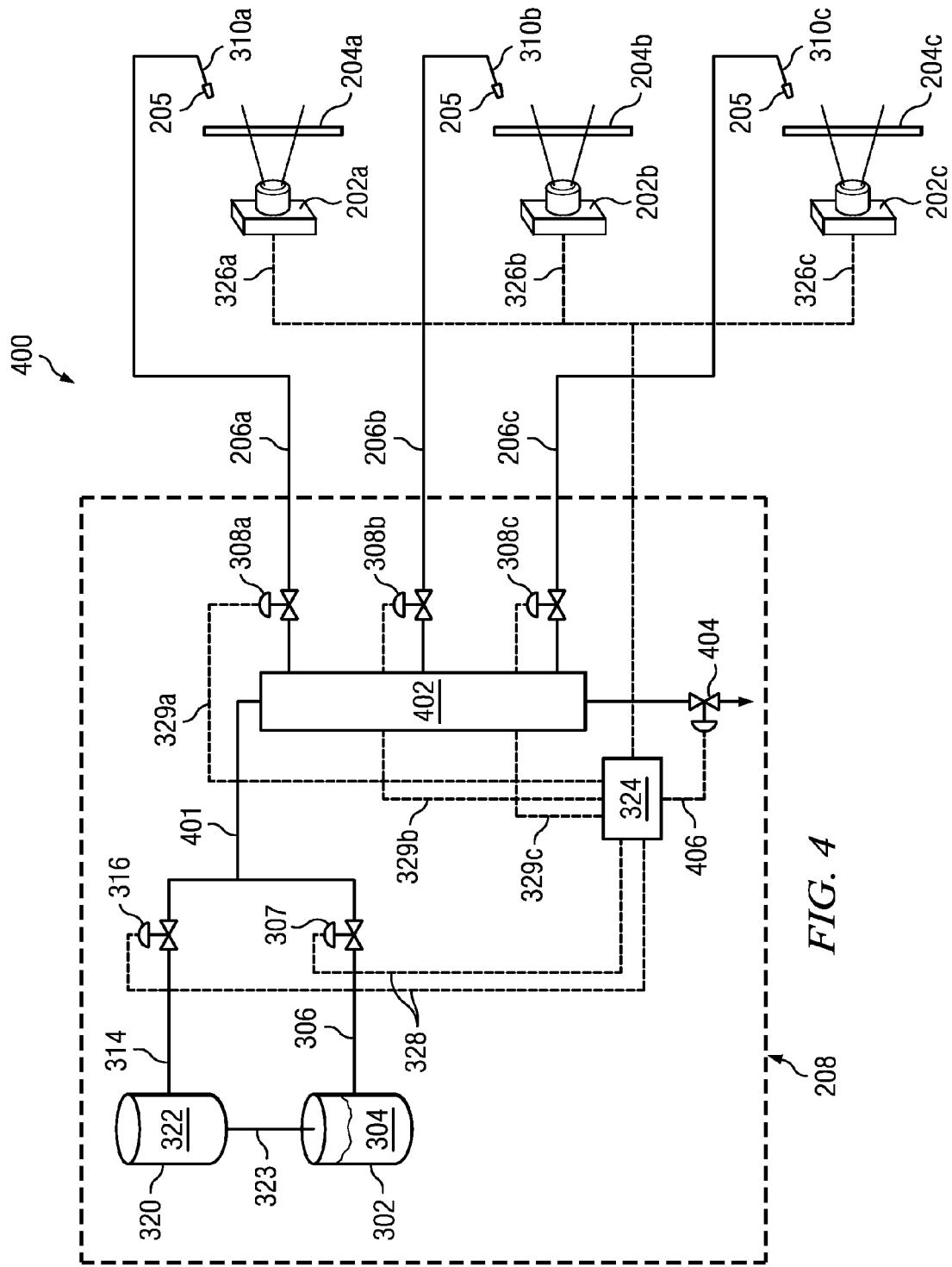
FIG. 4 is a schematic diagram of a roadway monitoring camera cleaning system according to a second embodiment for cleaning multiple cameras.

The compressed gas 322 used with the compressed gas source 320 may be any of a number of gases, including but not limited to nitrogen and air. The gas should be inert and it is preferred that it be dry. Even though FIGS. 3 and 4 show the compressed gas source 320 as being a tank, it may take a variety of forms, including tanks, cylinders, compressors, or blowers. In one embodiment the gas source 320 may be mounted on a truck. In the illustrated embodiment the compressed gas source 320 is also used to pressurize wash fluid tank 302 via a gas pressure pipe 323. It is even possible for the compressed gas source 320 to be integrated with the wash fluid source 302, where the compressed gas 322 is used to pressurize the wash fluid 304 in a tank having a liquid level, separate outlets for the gas and wash fluid above and below the liquid-gas interface, and separate control valves. The preferred range of pressures for the compressed gas can vary widely, depending on the design of the individual system. Testing has shown, however, that pressures of between 10 psi and 50 psi are generally sufficient to overcome the line losses and remove the wash fluid 304 from the lines 206 and viewing surface 204. Cleaning multiple cameras simultaneously would require higher pressure.

While FIG. 3 conceptually illustrates the wash fluid/gas supply valving as two separate valves 307, 316, these can be integrated into a single valve having fluid, gas, and closed positions. Further, the dryer 318 alternatively could be positioned upstream of gas source or tank 320, at its inlet (not shown).

An intelligent controller 324 receives a signal via line 326 (or alternatively, wirelessly) from the camera 202 and automatically determines whether the viewing surface 204 has reached a predetermined wash threshold stored so as to be accessible to the controller logic. The wash threshold is a predetermined value that is established to represent a maximum amount of degradation of the image taken by the camera 202 that will be tolerated, and may be determined according to one or more criteria. For example, the wash threshold may be calculated according to an opacity, or haziness, value through the viewing surface 204, according to the amount of light scattered by the viewing surface 204, according to a refractive index or change in refractive index of the viewing surface 204, or according to a confidence interval or an error rate generated from an optical character recognition engine operating on the images, manual review of the images (as on a laptop) or as a function of more than one of these. In the illustrated embodiment the conceptual controller 324 includes a programmable logic controller housed in cabinet 208, but also may include a processor and memory of one or more computers located off-site but in communication with the local element of controller 324. This can be the case where an off-site component of controller 324 receives images from camera 202, and possibly signals from other sensors collocated with camera 202, to determine opacity, refractive index, scattering or OCR error rate. In that instance the off-site component of controller 324 will command the local component of controller 324 to actuate the cleaning system when the off-site component determines that the predetermined wash threshold has been met.

In response to the viewing surface 204 reaching the predetermined wash threshold, the controller 324 operates control valve 307 through control line 328 to initiate a wash period or cycle by connecting the wash fluid source 302 to the upstream end 312 of the delivery tube 206. The wash fluid 304 impinges on the viewing surface 204 for a desired length of time, preferably between one second and one minute. The period of wash fluid delivery is determined by the composition of the wash fluid 304, the pressure at which it is delivered, and the amount and kind of debris typically accumulated on the viewing surface 204; if subsequent images taken through camera 202 continue to exhibit degradation, another cleaning cycle can be initiated by controller 324. The controller 324 can be programmed such that the wash period has seasonal variation.

Once the wash cycle is completed, a dry cycle can begin. The dry cycle can be considerably longer than the wash cycle, typically two to five minutes in length, because it is usually desirable to remove all of the wash fluid 304 from camera viewing surface 204 and from the interior of delivery tube 206 and nozzle 205, particularly when these are subjected to freezing conditions.

The controller 324 connects the compressed gas source 320 to the upstream end 312 of the delivery tube 206 via control valve 316. The controller 324 is connected to the control valves 307, 316 with one or more control lines 328, which may be electrical lines, an addressed communications bus, pneumatic lines, or even wireless transmitter/receiver pairs.

In one embodiment the wash and dry cycles can be manually executed, either remotely or locally. In this embodiment, a worker may determine that a camera 202 needs to be cleaned or may receive a communication from the controller 324 indicating that the wash and dry cycles for that camera should be manually executed. This manual mode of operation provides additional operational flexibility for the system 300.

FIG. 4 shows a second embodiment 400 of the invention, meant for a site with multiple cameras. As before, a pressurized dry gas source 322 (here the gas 322 is assumed to be nitrogen and as such does not require a dryer) is selectively connectable through a valve 316 to the upstream end of a supply conduit 401. The wash fluid source 302, which may be a tank that is pressurized by gas source 320 through a line 323, is selectively connectable to the supply conduit 401 via operation of a valve 307. As before, valves 316 and 307 may be combined into a single, three-position valve.

The supply conduit 401 branches to connect to each of the inlets of multiple delivery tube valves 308a-c. In one embodiment, the supply conduit 401 is connected to an inlet of a manifold 402, which has multiple outlets that are connected to inlets of the delivery tube valves 308a-c. Only three such valves (and three supply tubes and cameras) are shown here for purposes of illustration; an over-the-road four-lane tollway camera monitoring system may have as many as 22 manifold outlet ports, valves, delivery tubes and cameras, or more. A purge valve 404 is connected to a downstream terminal outlet of the manifold 402, and is operable via control line 406 from the controller 324. The controller 324 (such as a programmable logic controller) has control lines 329a-329c which connect control outputs of the controller 324 to respective relays on each of the delivery tube valves 308a-308c. The logic, memory and functions of controller 324 may be distributed between a local component such as a programmable logic controller 324 (shown), and one or more remote computers (not shown) in communication with the local component by any suitable means, as by wireless data, other telemetry or the Internet. At least the local component of the controller 324, the delivery tube valves 308a-c, supply conduit 401, manifold 402, fluid/gas switching valves 316 and 307, purge valve 404 and pressurized fluid and gas sources 320 and 302 may all be housed in a cabinet 208 so as to be sheltered from the elements.

Outlets of the delivery tube valves 308a-c are each connected to the supply ends of respective delivery tubes 206a-c. These extend from the cabinet 208 up one or the other of the gantries (see FIG. 1) to their delivery ends 310a-c, which are installed so as to be proximate to, in front of and slightly above respective camera viewing surfaces 204a-c. The delivery ends 210a-c preferably are fitted with nozzles 205 to focus and direct fluid and gas onto the respective camera viewing surfaces 204a-c.

Each of the cameras 202a-c has a signal output which communicates images and possibly separate image resolution data back to the controller 324. These image outputs can be hard-wired back to the controller 324 via output lines 326a-c, as shown, can be nodes on an addressed communications bus which also has a node at controller 324, or can communicate the image data wirelessly. As before, the controller 324 reviews its image input data to see if one or more of the cameras have had their captured images degraded so much that a predetermined wash threshold has been passed. The lines 326a-c may also transmit control signals from the controller 324 to each of the cameras 202a-c to change their focus or position, if they are equipped with appropriate focusing mechanisms or movement servos. The controller may be programmed to operate delivery tube valves 308a-c one at a time, or in groups, or all at once, in conjunction with the timed operation of valves 316 and 307, as will be described in more detail below.

As best shown in FIG. 2, the delivery tube nozzle 205 can be used to direct the wash fluid 304 and the compressed gas 322 onto the viewing surface 204 in a desired pattern and at a predetermined angle of incidence. The nozzle 205 preferably is angled and positioned to sweep the dirt and debris downward. Terminating the delivery tube end 310 with the nozzle 205 also increases the velocity of the wash fluid 304 and the compressed gas 322 to enhance the removal of dirt, debris, ice, snow and liquid from the viewing surface 204.

Figure 5:
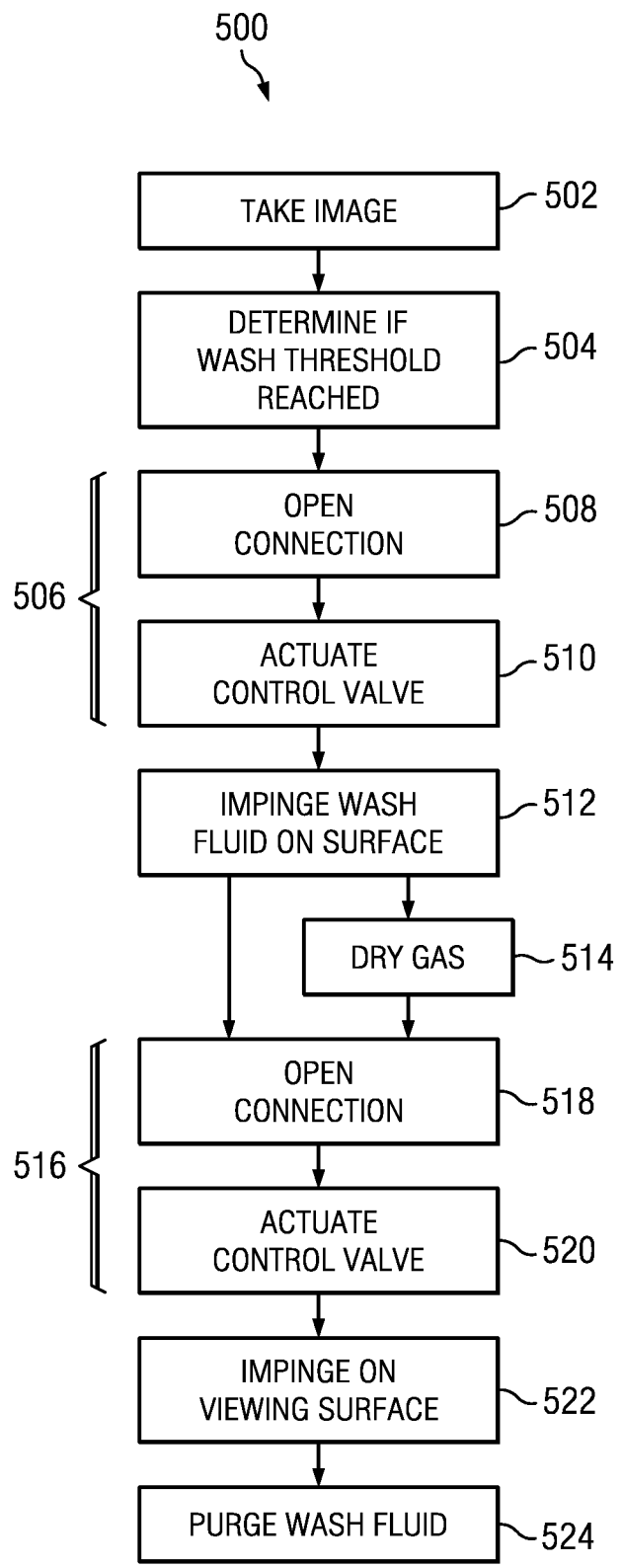
FIG. 5 is a flow diagram showing a method of cleaning the roadway monitoring system of FIG. 1.

The above embodiments can be operated according to a method diagrammed in FIG. 5. Therein, a method (500) of cleaning the roadway monitoring camera system comprises the steps of taking (502) an image with at least one camera 202 through a viewing surface 204 exposed to outdoor environmental conditions and automatically determining (504), from the image itself, or from other data transmitted with the image to the controller 324, whether the wash threshold has been reached. The degree of image degradation can be ascertained using opacity, refractive scattering, change in OCR confidence interval or some mathematical function of two or more of these, and the value thus derived is compared against the stored wash threshold reference. Responsive to determining that the wash threshold has been reached, the wash fluid 304 is caused to flow (506) from the wash fluid source 304 through a delivery end 310 of one or more delivery tubes 206.

The step of flowing (506) the wash fluid 304 may comprise the substeps of opening (508) a connection from the controller 324 to the fluid source control valve 307. Also at this time one or more delivery tube valves 308a-c are actuated (510) to complete a fluid path from the pressurized wash fluid tank 302 to one or more of the delivery tube ends 310a-c. Once the wash fluid 304 leaves the delivery tube 206, it impinges (512) on the viewing surface 204.

A compressed gas 322 may be dried (514) with a dryer 318 before it flows (516) from the compressed gas source 320 and impinges (522) on the viewing surface 202. As above, the step of flowing (516) the gas 322 may have the substeps of opening (518) a connection such as a network connection from the controller 324 to a control valve 316 that is in fluid connection with the compressed gas source 320, and actuating (520) the one or more of the delivery tube valves 208a-c to create a path from tank 320 to one or more of the camera viewing surfaces 204a-c.

The controller 324 may wash and dry all of the camera viewing surfaces 204 at the same time, or wash and dry the camera viewing surfaces one at a time, or wash and dry the camera viewing surfaces 204 in two or more groups. The controller 324 may be variously programmed to ascertain image degradation in particular ones of the cameras 202 and cause just those cameras to be cleaned, or, responsive to any of them crossing the wash threshold, actuate all of the delivery tube valves in series or in parallel. Where the camera viewing surfaces are to be cleaned in series, the controller can open the fluid source, open a first delivery tube valve, close the fluid source and open the gas source, close the first delivery tube valve, open the fluid source and a second delivery tube valve, and so on until the process has cycled through all of the cameras, or alternatively through only those cameras which controller 324 has ascertained need cleaning.

Following the overall camera monitoring system cleaning cycle, the system 300, 400 may be purged (524) as needed to remove any water out of the system. The system then waits for the next cleaning cycle triggering event.

In summary, the described systems and method allow for cleaning of roadway monitoring cameras in a manner that reduces both the hazards currently experienced by cleaning crews and simultaneously reduces the amount of maintenance time. This results in increased reliability and higher performance of the system in general.

While illustrated embodiments of the present invention have been described and illustrated in the appended drawings, the present invention is not limited thereto but only by the scope and spirit of the appended claims.

We claim:

1. A roadway monitoring camera cleaning system comprising:
    a plurality of roadway monitoring cameras for capturing images, each camera disposed to capture images through a respective viewing surface exposed to outdoor environmental conditions;
    a pressurized wash fluid source;
    a conduit having an upstream end selectively connected to the wash fluid source through a supply valve and a downstream end connected to a delivery tube manifold;
    a plurality of delivery tubes, each delivery tube having a supply end in fluid connection with the manifold via a delivery tube valve and a delivery end disposed to be proximate the viewing surface of a respective camera, the delivery tube valve and the supply valve operable to selectively supply wash fluid to at least one of the delivery tubes, such that the wash fluid exits the delivery end of the delivery tube and impinges on the viewing surface of the camera.

2. The cleaning system of claim 1, wherein the delivery tube valve is one of a plurality of delivery tube valves each independently actuable to fluidly connect the downstream end of the conduit to the delivery tube manifold.

3. The cleaning system of claim 1, further comprising a controller coupled to each of the cameras for determining whether each respective viewing surface has reached a predetermined wash threshold, the controller operating at least one of the delivery tube valves to fluidly connect the supply end of the conduit to at least one delivery tube as a function of whether the wash threshold has been reached.

4. The cleaning system of claim 3, wherein the controller is operable to actuate multiple delivery tube valves at once.

5. The cleaning system of claim 3, wherein the delivery tube valve is one of a plurality of delivery tube valves each operable to connect a respective delivery tube to the manifold, the controller operating the supply valve and at least one of the delivery tube valves to fluidly connect the wash fluid source to at least one delivery tube connected to said at least one delivery tube valve.

6. The cleaning system of claim 1, further comprising a pressurized gas source of dry inert compressed gas, the gas source selectively connected to the supply end of the delivery tube by the supply valve.

7. The cleaning system of claim 6, wherein the dry inert compressed gas source includes a compressed gas dryer for removing water from a compressed gas.

8. The cleaning system of claim 6, wherein the controller operates the delivery tube valve to connect the downstream end of the conduit to at least a selected one of the delivery tubes to the manifold, and operates the supply valves to connect the upstream end of the conduit to the wash fluid source, the controller subsequently operating said supply valve and the delivery tube valve to connect the pressurized gas source to the selected one of the delivery tubes to thereby dry a respective one of the viewing surfaces and to dry the conduit and connected delivery tube.

9. A roadway monitoring system comprising:
    a plurality of roadway monitoring cameras for capturing images, each camera disposed to capture the images through a viewing surface exposed to outdoor environmental conditions;
    a gantry extending across a roadway, each of the roadway monitoring cameras mounted on the gantry;
    a pressurized wash fluid source;
    a conduit having an upstream end selectively connected to the wash fluid source through a supply valve and a downstream end connected to a delivery tube manifold;
    a plurality of delivery tubes, each delivery tube having an supply end in fluid connection with the manifold via a delivery tube valve and a delivery end disposed to be proximate to the viewing surface of a respective one of the cameras, such that a wash fluid exiting the downstream end of the conduit will impinge on the viewing surface; and
    a controller.

10. The monitoring system of claim 9 wherein the gantry extends across at least two lanes of traffic, at least one of the plurality of cameras directed to each of the at least two lanes of traffic.

11. A method for monitoring a roadway comprising the steps of
    disposing a plurality of cameras in different positions on a gantry over a roadway, each of the plurality of cameras having a viewing surface;
    providing at least one delivery tube for each of the plurality of cameras;
    providing a nozzle disposed on a downstream end of each of the delivery tubes, the nozzle being in close proximity to the respective viewing surface;
    providing a wash fluid source selectively connected to an upstream end of each of the delivery tubes;
    providing a compressed gas source selectively connected to an upstream end of each of the delivery tubes;
    using a controller to actuate the flow of a wash fluid from the wash fluid source through the nozzle of the delivery tubes;

responsive to said step of using the controller to actuate the flow of the wash fluid, impinging the wash fluid on the viewing surface;

using the controller to actuate the flow of a compressed gas from the compressed gas source through the nozzle of the delivery tubes; and responsive to said step of using the controller to actuate the flow of the compressed gas, impinging the gas on the viewing surface.

\* \* \* \* \*